(12) United States Patent
Timoney

(10) Patent No.: US 6,357,954 B1
(45) Date of Patent: *Mar. 19, 2002

(54) VEHICLE STEERING SYSTEM

(76) Inventor: Eanna Pronsias Timoney, St. Anthonys, Boyne Road, Navan, County Meath (IE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,820

(22) Filed: Aug. 17, 1998

(30) Foreign Application Priority Data

Aug. 15, 1997 (IE) ................................................. S970611

(51) Int. Cl.[7] .............................. F16C 11/00; F16I 1/12
(52) U.S. Cl. ............................... 403/78; 403/119; 74/96
(58) Field of Search ............................ 403/78, 79, 118, 403/54, 53, 157, 150, 154, 156, 161, 119, 137; 74/496

(56) References Cited

U.S. PATENT DOCUMENTS

| | | | | |
|---|---|---|---|---|
| 5,312,199 A | * | 5/1994 | Smith, Jr. ................. | 403/53 X |
| 5,484,220 A | * | 1/1996 | Lewis et al. .............. | 403/78 X |
| 5,529,421 A | * | 6/1996 | Epkens ........................ | 403/78 |
| 5,564,853 A | * | 10/1996 | Maughan .................... | 403/137 |
| 5,607,248 A | * | 3/1997 | Hasse .......................... | 403/78 |
| 5,772,350 A | * | 6/1998 | Fergunson et al. ............ | 403/78 |

* cited by examiner

Primary Examiner—Lynne H. Browne
Assistant Examiner—John R. Cottingham
(74) Attorney, Agent, or Firm—Jacobson Holman, PLLC

(57) ABSTRACT

A connector for a vehicle steering system for attachment between a steering link such as a track rod and a steering arm on a wheel to accommodate vertical movement and swivelling of the wheel in use. Such connectors are usually provided by ball joint connectors. In the present invention these ball joints are essentially replaced by a connector in which opposite ends of the connector are rotatable relative to each other using only single axis pivots.

17 Claims, 3 Drawing Sheets

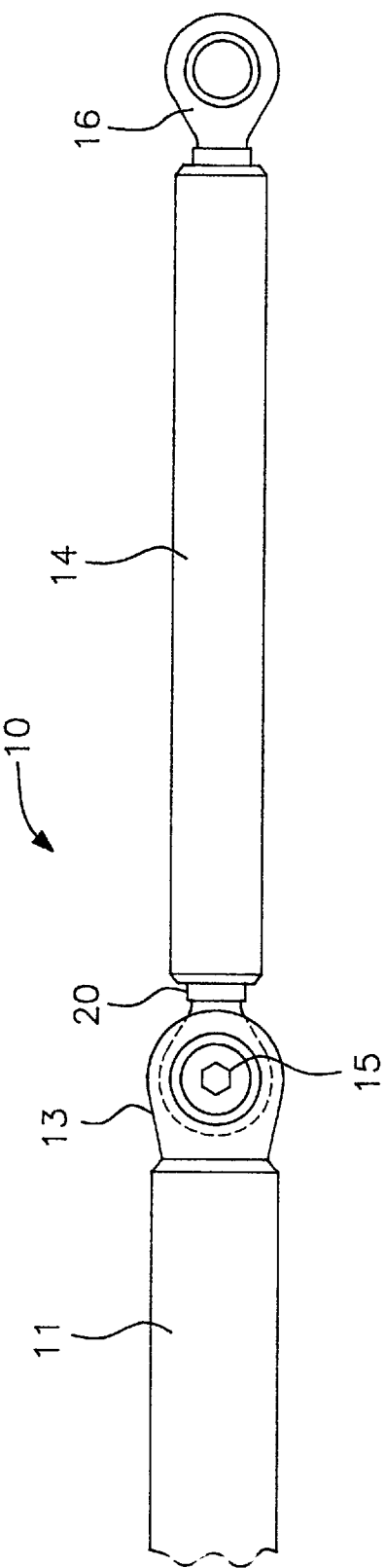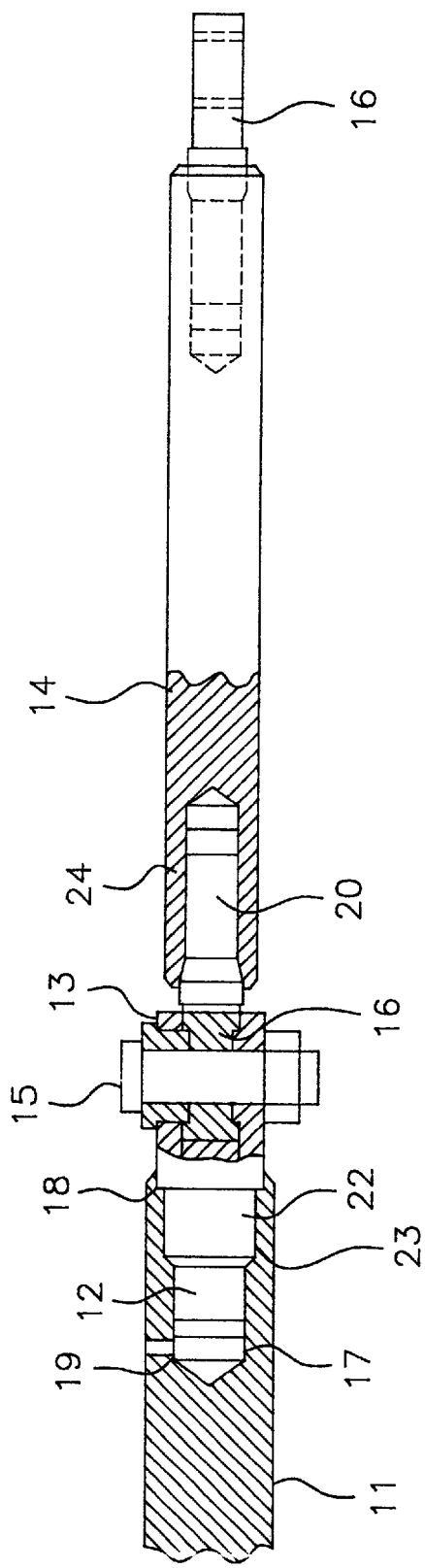

VEHICLE STEERING SYSTEM

This invention relates to a vehicle steering system, and in particular to a steering system or vehicles with independent suspension.

Steering systems for conventional beam axle trucks are arranged with ball jointed rod ends which cater for the angular rotation of the wheels as shown typically in FIG. 1 of the attached drawings. Each wheel is fitted with a steering arm 1 and these steering arm 1 are connected to each other by a track rod 2 by means of ball joints 3.

In independent suspension systems, each wheel can move in the vertical direction independently of the other wheel. In such systems a single track rod is not sufficient and an arrangement typically as shown in FIG. 2 of the attached drawings is required. In this case the track rod is replaced by a system which provides an interconnection between the wheels whilst allowing independent vertical motion of the wheels. This is achieved by means of links 4 and 5 which replace the one piece track rod described previously in FIG. 1. The links 4 are fitted with ball joints 6 at each end to allow vertical articulation of the wheel. Such systems or variations thereof are commonly used in automotive independent suspension systems. In most conventional systems wheel vertical articulation is relatively small and the links 4 are relatively long and so very large angular movement of the articulation joints 6 is not required.

In high performance independent suspension systems for high mobility vehicles, wheel movements in excess of 350 mm are commonly required. With such wheel movements large joint articulations in excess of 40° are frequently required. This is beyond the capacity of normal steering ball joints and requires the use of special spherical joints with high angular capacity and complicated sealing. Satisfactory sealing for all conditions is very difficult to achieve for such high angular movement. These joints are also relatively complex and expensive to produce.

The present invention is directed towards overcoming these problems.

It is an object of the invention to eliminate the need for special spherical joints while permitting high articulation with relatively simple sealing.

The objects of the invention are achieved by replacing the special spherical joints by a connector in which opposite ends of the connector are rotatable relative to each other. Preferably the connector is of two-part construction said parts being pivotally interconnected.

According to the invention there is provided for a connector for a vehicle steering system, the connector for attachment between a steering link and a steering arm on a wheel to accommodate vertical movement and swivelling of the wheel in use, characterised in that the connector has opposite ends for attachment to the steering link and steering arm, said opposite ends of the connector being rotatable relative to each other using only single axis pivots.

In one embodiment of the invention the pivot axes intersect.

In another embodiment a pivot joint at one end of the connector comprises a swivel pin rotatably mounted in a complimentary housing.

In a further embodiment pivot joints at opposite ends of the connector each comprise a swivel pin rotatably mounted in a complimentary housing.

In another embodiment the connector is hinged intermediate the ends of the connector.

In another embodiment the swivel pin has a journal portion for engagement with an associated bearing in the housing.

Preferably at least portion of a pin has a screw thread for complementary engagement with an associated threaded bore portion of the housing. In another embodiment the pin engages the housing by means of a complementary screw thread.

In another embodiment the connector comprises a swivel pin and associated housing at an outer end of the connector for engagement between the connector and the steering arm, a pivot pin being provided at an inner end of the connector for connection to an associated eye attached to the steering link.

In a further embodiment the connector comprises a pair of hingedly connected swivel pins, comprising a first swivel pin which rotatably engages an associated housing on the steering arm and a second swivel pin which rotatably engages an associated housing on the steering link.

In another embodiment one swivel pin has a forked end for reception of an end of the second swivel pin which has an eye which engages between the forks, a pivot pin engaging through the forks and eye to hingedly connect the swivel pins.

In another aspect the invention provides a vehicle steering system incorporating a connector.

In a still further aspect the invention provides a vehicle incorporating a steering system.

The invention will be more clearly understood by the following description of an embodiment thereof given by way of example only, with reference to the accompanying drawings, in which:

FIG. 5 is an elevational view of portion of the connector; and

FIG. 6 is a partially sectioned elevational view of the connect portion of FIG. 5.

Figure 1:
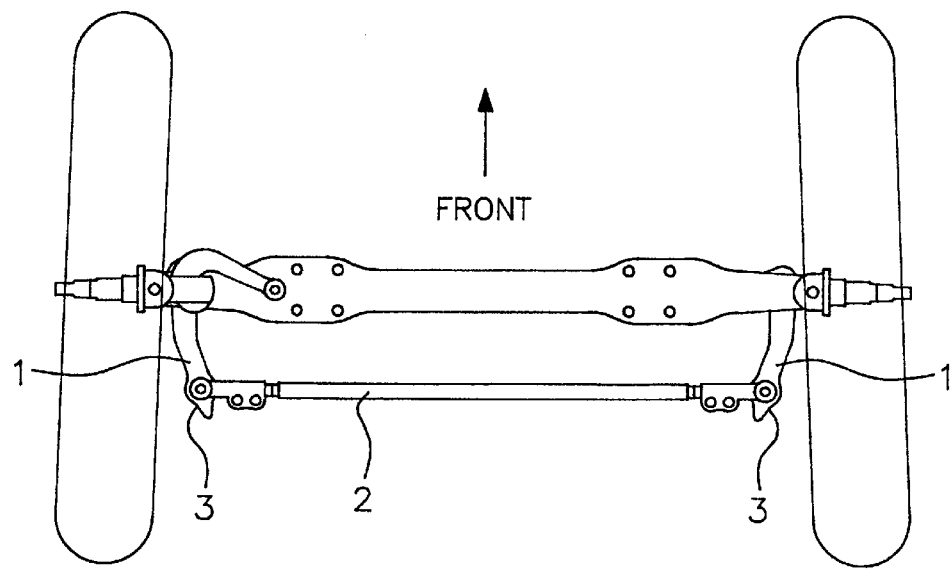
FIG. 1 and FIG. 2 are diagrammatic illustrations of prior art steering systems.
Figure 2:
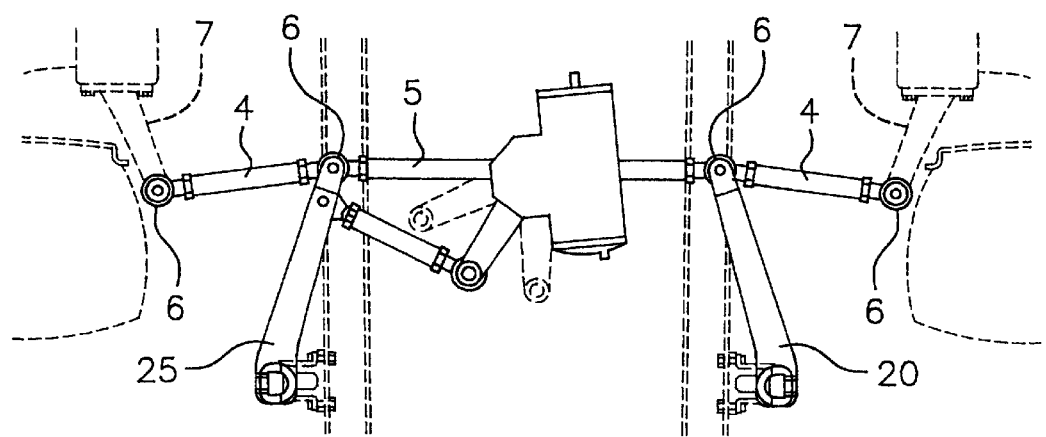
Figure 3:
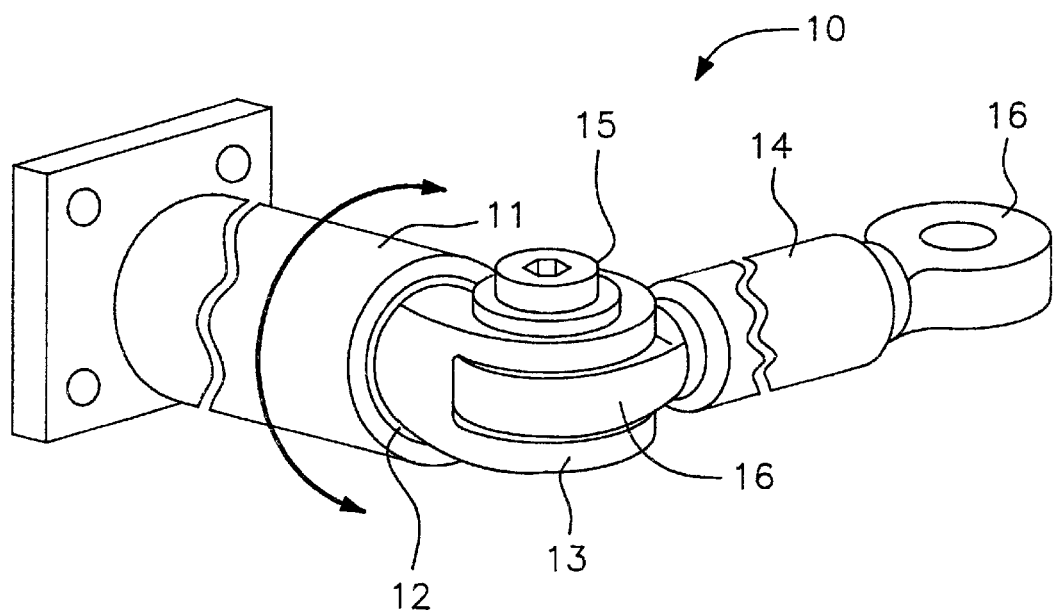
FIG. 3 is a perspective view of a connector for a steering system according to the invention.
Figure 4:
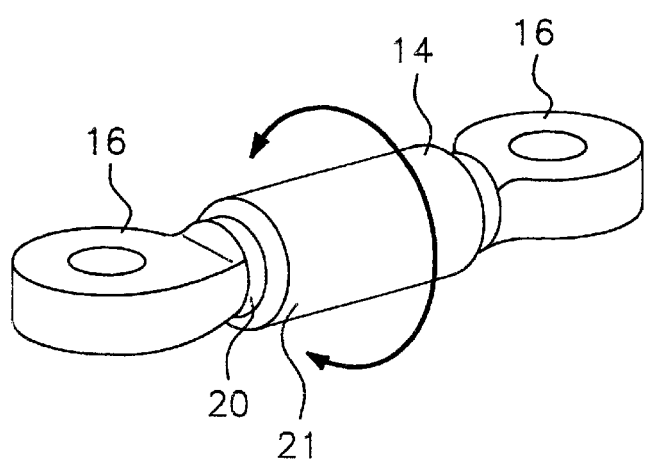
FIG. 4 is a perspective view of portion of the connector.

Referring to the drawings FIGS. 1 and 2 show prior art steering systems as previously described.

Referring now to FIGS. 3 to 6 there is shown a connector for a steering system according to the invention indicated generally by the reference numeral 10. In accordance with the present invention this connector 10 is provided at the joints between the end of each steering arm 7 and the associated links 4 (FIG. 2). The connector 10 comprises a housing 11 forming portion of the steering arm within which a swivel pin 12 is rotatably mounted, the pin 12 terminating in a forked end 13 for connection to a steering link arm 14 by means of a pivot pin 15. The link arm 14 replaces the link arm 4 in FIG. 2. The link arm 14 has a similar rotating pin 20 within a housing 21 (see FIG. 4) the pin 20 terminating in an eye. It will be appreciated that the connector 10 essentially comprises a plain cylindrical bearing of the fork type which when fitted to the steering arm 7,11 enables the fork 13 to rotate generally about an axis generally at 90° to the axis of the bearing pin 12. This angle may vary to optimise the geometry of the system.

The link 14 may be of one piece construction or may be of a two piece construction to allow relative rotation between eyes 16 at each end of the link 14 in order to provide a further degree of freedom to the system if required.

Referring in particular to FIGS. 5 and 6 one possible construction of the connector 10 is shown. The fork 13 has a threaded pin 12 which fits into a corresponding threaded section 17 in the housing 11 of the steering arm. The fork 13 may have male or female threads and the steering arm vice versa as most convenient. A journal portion 22 of the pin 12 engages with an associated bearing 23 within the housing. A sealing means 18 may be provided and also a lubricating means 19 if desired. By this means the fork 13 is retained in the arm 11 but is free to rotate through the required angle by rotation on the threads 17. It will be readily appreciated that the required rotational compliance may be obtained by any other means—such as a plain bearing, tapered thrust bearing, etc., within the principle of the present invention.

A similar connector 10 may be similarly installed in the relay arm 25 (FIG. 2). The link 14 may have a similar fitting if some rotational compliance is required in the link 14. In the embodiment shown in FIG. 6 the pin 20 is fully threaded for engagement with a complementary threaded bore 24 of the link 14.

It will be appreciated that in the embodiment shown in FIG. 6 the swivel pin 12 has a bearing portion as well as a threaded portion. However, if desired the pin 12 may be fully threaded with the threaded engagement between the pin 12 and housing 11 forming a bearing. If desired the threads may be Teflon coated. The threads advantageously retain the pins within their associated housing. It will be noted that the pins may be provided on the steering arm and/or the steering link with the associated housing or housings being provided on the connector. Also, in order to retain the pins in engagement with the housing any suitable means other than the threaded engagement may be provided.

It will be appreciated that the invention provides a relatively simple connector for a steering linkage which is cheap to manufacture and reliable in operation. It will also be noted that while in the embodiments described herein the housing forms an integral part of the steering arm or steering link suitable housings or pins may be adapted to be bolted or welded onto the steering arm and steering link.

The invention is not limited to the embodiment hereinbefore described which may be varied in both construction and detail.

What is claimed is:

1. A vehicle steering system incorporating a connector mounted between a steering link and a steering arm which is attached to a wheel of a vehicle to accommodate vertical movement and swivelling of the wheel in use, the connector being of two-part construction comprising a housing part with a threaded bore and an associated swivel pin part having a threaded end in complementary threaded engagement within the bore for swivelling movement of the pin on the housing to provide a pivot connection between the two parts, one part being mounted on the steering arm and the other part having means for pivotally connecting said other part to the steering link, the threaded portions of the bore and the pin being coated with a low friction material.

2. A steering as claimed in claim 1, wherein the swivel pin and the housing are additionally provided with inter-engaging bearing portions.

3. A steering system as claimed in claim 2, wherein the swivel pin is provided with a journal portion for complimentary engagement with an associated bearing portion in the bore of the housing.

4. A steering system as claimed in claim 1, wherein the housing part is mounted on the steering arm.

5. A steering system as claimed in claim 1, wherein a rotating pin is provided at an outer end of the steering link which is attached to the connector, the rotating pin being mounted on the steering link by complementary inter-engageable male and female threaded portions on the steering link and on the rotating pin.

6. A steering system as claimed in claim 5, wherein the rotating pin and the steering link further include inter-engaging bearing portions.

7. A steering system as claimed in claim 5, wherein one of the swivel pin and the rotating pin has a forked end for reception of an eye on the other of the swivel pin and the rotating pin which locates between forks of the forked end, a pivot pin engaging through the forks and eye to pivotally attach the connector to the steering link.

8. A steering system as claimed in claim 5, wherein a second rotating pin is provided at an inner end of a steering link, said second rotating pin being mounted on the steering link by complimentary inter-engageable male and female threaded portions on the steering link and on the second rotating pin.

9. A vehicle incorporating a steering system as claimed in claim 1.

10. A vehicle steering system incorporating a connector mounted between a first link and a second link of the steering system to accommodate vertical movement and swivelling of wheels controlled by the steering system in use, the connector being of two-part construction comprising a housing part with a threaded bore and an associated swivel pin part having a threaded end in complimentary threaded engagement within the bore for swivelling movement of the pin on the housing to provide a pivot connection between the two parts, and means for connecting each of said parts to the links to pivotally interconnect the links.

11. A vehicle steering system as claimed in claim 10, wherein the threaded portions of the bore and the pin are coated with a low friction material.

12. A vehicle steering system as claimed in claim 10, wherein the swivel pin part has a journal portion which engages an associated bearing within the housing.

13. A vehicle steering system as claimed in claim 10, wherein the first link forms a steering arm of the steering system and the second link forms a steering link of the steering system.

14. A vehicle steering system as claimed in claim 13, wherein the housing part is mounted on the steering arm and the swivel pin is mounted on the steering link.

15. A vehicle steering system as claimed in claim 13, wherein a rotating pin is mounted at an outer end of the steering link which is attached to the connection, the rotating pin being mounted on the steering link by complimentary interengagable male and female threaded portions on the steering link and on the rotating pin.

16. A vehicle steering system as claimed in claim 15, wherein one of the swivel pin and the rotating pin has a forked end for reception of an eye on the other of the swivel pin and the rotating pin which locates between forks of the forked end, a pivot pin engaging through the forks and eye to pivotally attach the connector to the steering link.

17. A vehicle steering system as claimed in claim 15, wherein a second rotating pin is provided at an inner end of the steering link, said second rotating pin being mounted on the steering link by complimentary interengable male and female threaded portions on the steering link and on the second rotating pin.

* * * * *